United States Patent Office 3,822,178
Patented July 2, 1974

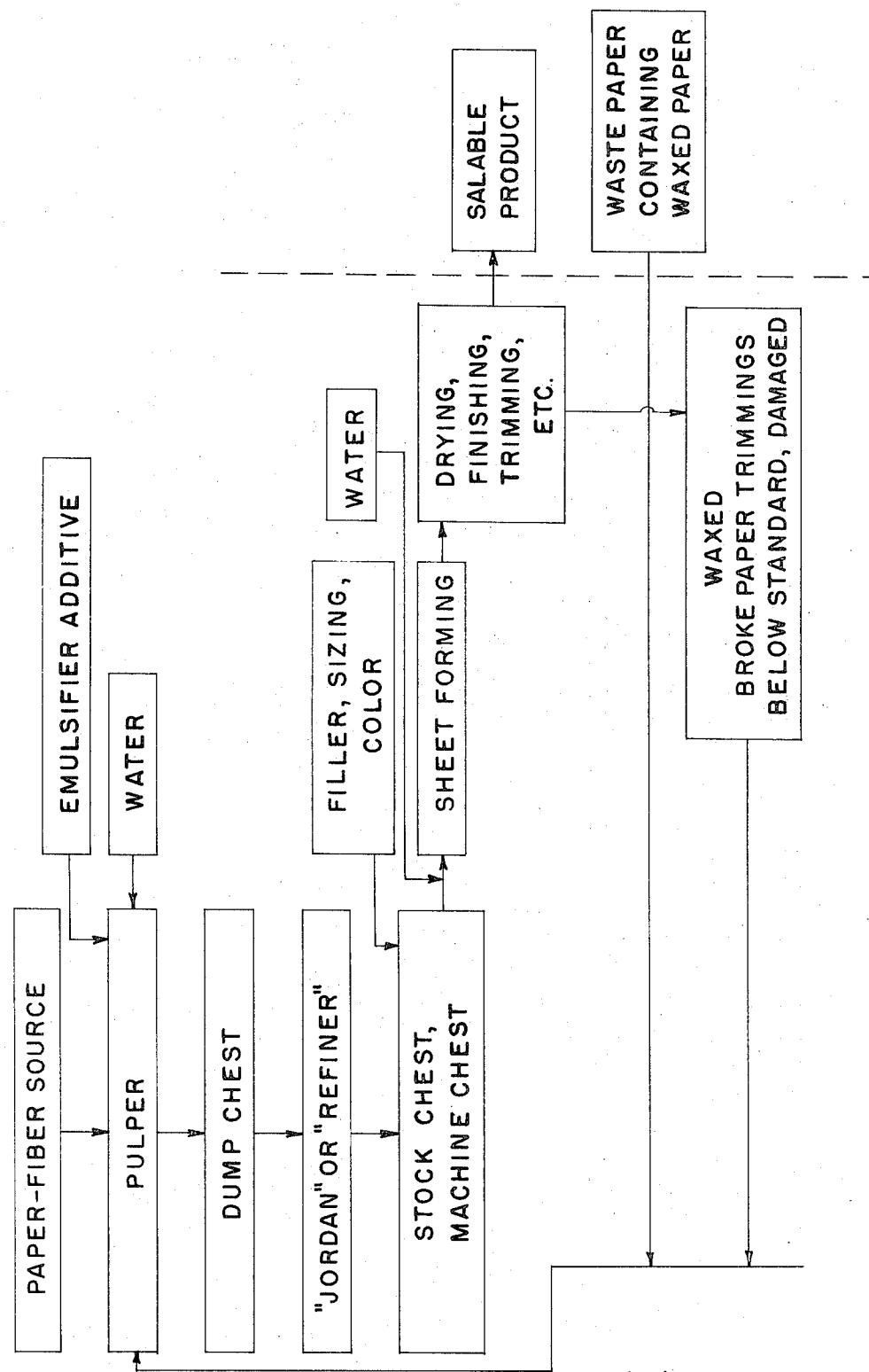

3,822,178
PROCESS FOR REPULPING WAXED PAPER USING A WATER SOLUBLE NONIONIC EMULSIFIER
Andreas von Koeppen, Lombard, and Reinaldo T. Carrera, Chicago, Ill., assignors to Wright Chemical Corporation, Chicago, Ill.
Filed Aug. 11, 1971, Ser. No. 170,843
Int. Cl. D21c 5/02
U.S. Cl. 162—5    28 Claims

ABSTRACT OF THE DISCLOSURE

A process for repulping waxed stock such as waxed paper or paperboard for use in Fourdrinier, or cylinder papermaking processes or wet-lap or screw-press dewatering processes. Waxed stock material, either alone or with non-waxed stock is charged to a pulper and combined with water and certain water soluble nonionic emulsifiers with mechanical agitation and at a temperature sufficiently high to melt the wax in the waxed stock. A dispersed wax-fiber slurry is thereby formed which can be diluted for further processing in a Fourdrinier or cylinder machine or, the thus formed dispersed wax-fiber slurry may be processed directly in a wet-lap machine.

---

This invention relates to a method of repulping and re-using waxed stock (e.g. waxed paper, waxed paperboard as well as other cellulosic materials which are impregnated or coated with similar water insoluble hydrocarbon materials such as mineral oil, petrolatum and the like) in papermaking and board making processes including Fourdrinier, cylinder and wet-lap operations.

Mills which manufacture waxed paper necessarily produce substantial quantities of waste waxed paper from trimmings, waxed apper which does not meet test standards or other specifications, and waxed paper which has been damaged or contaminated. Until the present time, these mills have not been able satisfactorily to recycle waxed stock because of process and equipment difficulties. As a result, these mills have been confronted with serious disposal problems for this waste waxed paper and similar stock which have generally necessitated the burning thereof, or paying waste dealers to haul it way. This necessarily involves waste of wax as well as waste of otherwise usable quality paper fiber. Since waste waxed paper which is discarded each month, in substance, is replaced with virgin pulp or high quality pulp substitute, such waxed paper which is wasted in these mills, in addition to presenting disposal probelms, represents a waste of an equivalent quantity of realtively expansive virgin pulp, or other high quality expensive pulp susbtitute.

In presently available commercial papermaking and board making operations there are at least three kinds of operations which are of major significance; namely, Fourdrinier, cylinder and wet-lap processes. These processes, though similar in principle, entail considerably different operation parameters. Generally, in each of these processes, a cellulosic fiber slurry having a solids consistency of from approximately 4% to 6% by weight is charged to a pulper such as a Hydropulper, Hollander, or the like. In both the Fourdrinier and cylinder processes the resulting slurry is then diluted substantially, usually to provide a solids consistency of approximately 0.5% and the cellulosic fibers are then deposited onto a papermaking machine. In the wet-lap operation cellulosic fibers are only partially processed to an intermediate holding stage in which so-called wet-lap is formed. The wet-lap, having from about 60 to 75% water, for example, may be maintained at that water level for substantial periods of time.

In accordance with the present invention a new and unobvious process is provided wherein waxed stock can be used in Fourdrinier, cylinder and wet-lap papermaking processes. Waxed stock either by itself or together with non-waxed stock is charged to a beater and combined with water and certain water dispersible nonionic emulsifiers with mechanical agitation and at a temperature sufficiently high to melt the wax constituent in the waxed stock, for example from approximately 150° F. to 190° F. An emulsified wax-fiber slurry is formed having a solids consistency of from approximately 4% to 6% by weight.

In the Fourdrinier and cylinder processes, this slurry is then further diluted to produce a resultant slurry having a solids consistency of approximately 0.5% to 1% by weight and charged to the particular sheet-forming machine being employed wherein the fibers are formed into a mat-like product and the initial liquid removal performed. Thereafter, suitable drying operations are employed to produce a paper or board product having the desired moisture content.

In the application of the present invention to a wet-lap process, the emulsified wax-fiber slurry from the beater is usually transferred directly to a wet-lap machine wherein a wet-lap product is produced which, after pressing, characteristically has a moisture content of from 60 to 75% by weight.

While the practice of the present invention encompasses the use of 100% stock having a wax content up to 30% by weight, it should be noted that normally in mill installations, the preferred practice of this invention will involve charging the pulper with an admixture of both waxed stock and non-waxed or virgin stock. In these instances, the stock being fed to the pulper will consist of from 10% to 50% of waxed stock having a wax content of from approximately 15% to 30% wax by weight, with the remainder of the stock being fed to the pulper being composed of non-waxed or virgin pulp.

Also, the invention is used to great advantage in operations which utilize nominally non-waxed stock containing as an occasional inadvertent admixture, some waxed stock. Such a feed material tends to result in wax deposition on the paper making machinery, or causes waxy spots to appear in the sheet or board after drying.

The water soluble nonionic emulsifiers contemplated by the present invention are selected from the group consisting of polyethylene glycol ethers of hydrophobic alcohols, alkyl phenoxy polyethxyethanols, fatty acid amides and mixtures thereof and meet a specified emulsion stability standard more fully enumerated below. The preferred water soluble nonionic emulsifiers for practicing this invention include: the ethoxylated aliphatic alcohols wherein the alcohol is a hydrophobic secondary alcohol having from 11 to 15 carbon atoms and wherein the average molar ratio of ethylene oxide to hydrophobic alcohol is in the range of 5:1 to 15:1; ethoxylated alkyl phenols in which the ratio of moles of ethylene oxide per mole of alkyl phenol is in the range of 7-8 inclusive; ethoxylated alkyl phenols in which the alkyl substituent is linear; and, the fatty acid amide diethanol amine condensates derived from a member selected from the group consisting of myristic acid, lauric acid, palmitic acid, stearic acid and mixtures thereof.

These water soluble nonionic emulsifiers are suitable for the practice of this invention where they meet the standard provided by the test comprising the following steps: (1) preparing an initial admixture consisting essentially of water, waxed paper, and emulsifier, in which admixture waxed paper is present in an amount of 3.3% by weight based on the weight of the water, and in which the waxed paper has a wax content of 17% by weight, and wherein the emulsifier is present in said initial admixture in an amount of 0.333% by weight based on the weight of the water in the initial admixture; (2) heating the resulting admixture to a temperature in the range 175–180° F. and stirring the heated admixture for 15 minutes while in that temperature range; (3) adding ambient room temperature water to said admixture in an amount which is five times the volume of the admixture, and admixing the added water therewith to provide a diluted admixture having an overall temperature which is below the melting point of the wax content thereof; (4) immediately filtering the resulting diluted admixture through a 40 mesh screen to provide a filtrate emulsion; and permitting the resulting filtrate emulsion to stand in glassware for 24 hours at ambient room temperature, and observing the diluted filtrate suspension to determine whether said suspension is stable 24 hours after dilution; wherein the said emulsifier meets said standard if the diluted filtrate emulsion of step (4) remains stable at ambient room temperature for 24 hours. The suspension is rated "stable" if no wax deposit appears on the walls of the glassware in which the suspension is stored for the stability test.

In the practice of this invention, although substantial quantities of wax are extracted from the waxed stock in an emulsified phase, wax does not contaminate or coat-out on the equipment even when slurries containing the emulsified and/or finely dispersed wax are subjected to cooling temperatures of the type typically encountered in these papermaking operations.

Products made in accordance with this invention are characterized by the complete absence of glossy specks even though they were formed from 100% high wax content stock. Typically, these products will have a retained wax content of from 2% to 4% by weight, although substantially lower retained wax contents in these products are achievable.

It is an object of this invention to provide a method for reusing waste waxed paper or waste waxed board in a papermaking or paperboard making process, which method does not require the use of organic solvents, such as aliphatic or chlorinated solvents.

It is a further object of this invention to provide such a method which utilizes equipment presently in use in commercial papermaking processes.

It is a further object of this invention to provide a method of recovering, recycling and reclaiming waxed paper, waste broke paper and waste paper and board containing substantial amounts of wax, which method results in the utilization of most of the recovered wax as well as the recovered fiber in the final resulting product.

It is a further object of this invention to provide a method of reclaiming waxed paper and board which is applicable to Fourdrinier, cylinder and wet-lap operations.

It is an important object of this invention to provide a method which changes the physical disposition of wax in waxed paper or board while releasing cellulosic fibers and freeing the fibers in such a manner that, should an admixture of the wax, in its new physical disposition, and the fibers, either alone or in admixture with virgin fibers be co-deposited, as in papermaking or boardmaking, the resulting products are free of undesirable wax spots or other grossly visible evidence of lack of uniformity.

It is another object of this invention to produce a wax emulsion or dispersion in a condition in which the wax will not agglomerate into large particles or significantly coat-out on, or otherwise contaminate the papermaking or boardmaking equipment, or create wax spots in the dried sheet even though alum and/or acid may be added to reduce the pH to 2.0. Likewise caustic soda may be added to raise the pH to 12 during the pulping process without adverse effect.

These and other objects which will be apparent hereinafter are all achieved in accordance with the method of this invention which is described, along with its relationship to a conventional papermaking and boardmaking method and illustrated in connection with the attached figure in which:

The figure is a diagrammatic flow sheet illustrating a conventional papermaking process which is modified in accordance with this invention to achieve satisfactory reclaiming of waxed paper and board.

With respect to a preferred embodiment as illustrated in the figure, wood or fiber source material is subjected to a pulping process which results in a fiber-water slurry. In accordance with a preferred embodiment of this invention, the wax dispersant is added to the pulper. Also, in accordance with a preferred embodiment of this invention waste paper containing waxed paper, and waxed broke paper trimmings, below standard or damaged waxed paper, and the like are added to the pulper. The term pulper is used in the example, and in the claims appended hereto, and it is to be understood that any equipment such as a conventional high speed pulper (Hydropulper T.M.) may be used. Known conventional pulpers are preferred. The temperature of the wax-containing fiber slurry is raised to a temperature above the melting point of the wax and beating is continued until the wax and fiber are released into the aqueous phase. The resulting water-fiber slurry is conventionally charged to a dump chest and passes through a "Jordan" or "refiner" and to stock chests and machine chests. Conventionally alum, filler, sizing and/or color is admixed with the aqueous slurry in a stock chest. The slurry is diluted in accordance with the needs of a particular sheet-forming machine, e.g. a Fourdrinier machine, a cylinder machine, wet-lap machine, etc. In Fourdrinier or cylinder operations, the resulting wet sheet is then subjected to drying for example, while being supported by a moving drying felt and to other known steps which can be used to produce a desirable salable paper or board product. In the wet-lap operation, the resulting wet sheet is maintained at a relatively high water content until the wet-lap is later charged to a pulper for utilization of the fiber therein.

It is believed that in the practice of the process of this invention, some of the wax may be fully emulsified in the pulper, and that some of the wax may not be fully emulsified. However, all or a substantial portion, of such non-emulsified wax will be reduced to such fine particle size that it does not produce wax spots on the dried sheet product. Significantly, these finely dispersed minute particles of wax when present in the product of the process of this invention will not agglomerate even upon heating of the fibers as in the drying operation.

Thus some of the wax in the starting material is present on the particles of fiber in the product. However, such wax is present on the fibers in a finely divided form so as not to produce undesirable wax spots on the dried sheets, and in a condition in which it will not agglomerate to produce relatively larger particles which would appear as undesirable wax spots on the dried sheets. The finely divided, dispersed wax which is on the fiber particles in the product is in such a condition that it does not interfere with subsequent coating or printing operations.

In the manufacture of waxed paper the paper sheet is customarily first formed and then treated for the application of one or many different types of wax coatings, either in dry or liquid form, for example to form a barrier coating by application of molten paraffin wax thereto. Such waxed papers have excellent resistance to water vapor, are free from odor, taste, or toxicity and are low in cost. For example the molten paraffin wax is easily applied by continuously passing a paper sheet through a molten bath or nip, removing the excess and chilling. The use of modifiers, such as microcrystalline wax, polyethylene, or ethylene-vinyl acetate copolymer, is reported to improve the durability and film strength, raises the softening point and increases the gloss and heat-seal strength when needed, in addition to other advantages.

Waxed broke paper used in the illustrated embodiment comprising trimmings off a trimming machine, or paper that does not meet required test standards would have heretofore presented processing problems or resulted in the kind of waste referred to heretofore. In accordance with the present invention, however, the wax-containing broke paper, or waste paper containing substantial quantities of waxed paper is charged to the conventional beater and, a particular wax emulsifier in accordance with this invention is provided in the aqueous system in the beater.

The following test procedure is to be used for the purpose of assisting those with ordinary skill in the art to practice this invention in its broadest aspects and to define the class of nonionic water soluble emulsifiers which are found to be useful in this invention. The procedure of Example 2 is a specific illustration of the procedure of this test, in which the quantities chosen are convenient for testing in laboratories.

When the three separate tests are carried out as set forth hereinafter, the results of the tests determine whether or not a specific nonionic emulsifier is contemplated for use in accordance with this invention, whether it is a preferred emulsifier, or whether it is a most preferred emulsifier. The procedure of each respective test is identical except for differences in the amount of emulsifier used in each test.

TEST PROCEDURE

Three separate respective test mixtures (a), (b) and (c) are prepared by mixing respective quantities of waxed paper containing 17% wax with water in respective amounts to give respective paper-water mixtures having a consistency of 3.33% waxed paper by weight based on the weight of the water. A specific emulsifier to be tested is added to the respective mixtures in respective amounts to provide (a) 0.042% by weight emulsifier based on the weight of the water, (b) 0.166% emulsifier, and (c) 0.333% emulsifier, respectively in the respective mixtures. Each mixture is heated to a temperature in the range 175–180° F. with stirring. To be contemplated for use in accordance with the invention in the procedure with test mixture (c) must emulsify the wax and free the paper fibers within a period of time of 15 minutes while stirring at the 175–180° temperature. If an emulsion is formed in the 15 minute stirring period the emulsifier must also meet a second requirement. The resulting hot emulsion-slurry is diluted with a volume of room temperature water which is five times the volume of the pulp slurry (1:6 dilution), and the resulting diluted emulsion is filtered through a 40 mesh screen, to remove the fibers. The filtrate, stored in a glass container must remain stable for 24 hours. By stable, we mean no substantial wax deposition occurs on the walls of the glass container during the stability test period. To be classified as a preferred emulsifier for use in accordance with this invention, that emulsifier when used in the procedure, using test mixture (b), must emulsify the wax within the 15-minute period of stirring at the temperature in the range 175–180° F., and the subsequently diluted emulsion filtrate of test (b) will remain stable for 24 hours. To be classified as a most preferred emulsifier in accordance with this invention, the procedure with the mixture of test (a) forms an emulsion, and the diluted emulsion filtrate of test (a) will remain stable for 24 hours. Hence, this test procedure enables one with ordinary skill in the art to determine whether a specific nonionic emulsifier can be used in accordance with the method of this invention, and whether it is to be classified as a preferred or most preferred emulsifier. In accordance with the present invention the wax emulsifier is a nonionic emulsifier which meets the performance test standards. A preferred emulsifier is a member selected from the group of polyethylene glycol ether of hydrophobic alcohol, alkyl-phenoxy polyethoxy alkanols and fatty acid alkanol amides, especially coconut alkanol amides. These preferred wax emulsifiers for use in accordance with this invention are broadly classified as nonionic surfactants. However, other nonionic surfactants have been found to be completely unsatisfactory for use in accordance with the present invention.

A large number of the polyethylene glycol ethers of alcohol which are preferred wax emulsifiers for use in accordance with this invention are sometimes referred to as ethoxylated aliphatic alcohols, or alkyl polyethyleneoxyethanols. It is to be understood that commercially available surface active materials are normally mixtures of chemically similar, homologous compounds, and such homologous mixtures are intended to be included within the scope of the terms used to identify the surface active emulsifiers of this invention.

In the case of the preferred ethoxylated aliphatic alcohols used in accordance with this invention, the hydrophobic portions of the molecules can be mixtures of straight chain alcohols and the mole ratios of combined ethylene oxide to hydrophobe can vary greatly, e.g. from 1 to 50. The functional properties of the polyethoxylene alcohols parallel very closely those of the polyethoxylene alkyl phenols and the ethoxylation process and equipment for manufacture of the alkyl polyethoxylene ethanols are reportedly similar to those described in the literature for the alkyl phenol compounds. The preferred surface active compounds of the alkyl polethyleneoxyethanols are those compounds in which the starting alcohol is a secondary alcohol having a number of carbons in the range 11–15 and wherein the molar ratio of ethylene oxide and hydrophobic alcohol is in the range 5 to 1 to 15 to 1 with compounds having an average ratio in the range of 9 to 1 being most preferred. A number of such compositions are commercially available, e.g. such compositions are available under the trade name "Tergitol 15–S–5," "Tergitol 15–S–7," "Tergitol 15–S–9," "Tergitol 15–S–12" and "Tergitol 15–S–15." These compositions are mixtures of homologues wherein the hydrophobic alcohol is a mixture of secondary $C_{11}$–$C_{15}$ alcohols and wherein the molar ratios of ethylene oxide to hydrophobic alcohol are reportedly 5, 7, 9, 12, and 15, respectively. While it is not intended that the invention be limited by any theories, it is noted that the most preferred surface active materials of this class are compounds in which the hydrophylic substituent is bonded to a secondary carbon, possibly providing a desirable degree of wettability in addition to outstanding emulsification characteristics.

An example of an emulsifier in the ethoxylated aliphatic alcohol class which is derived from a primary linear $C_{12-15}$ alcohol having an ethoxy-hydrophobe molar ratio of 12:1 is "Neodol 25–12" (T.M.). An example of an emulsifier derived from lauryl alcohol and having an ethyleneoxy-alcohol ratio of 12:1 is "Lipal 12 LA" (T.M.). An example of an emulsifier derived from lauryl alcohol and having an ethoxy-hydrophobe molar ratio of 8:1 is known as "Trycol LAL–8" (T.M.). Although alkyl polyethyleneoxy ethanols produced from linear primary hydrophobic alcohols, particularly those having 12–15 carbons are also contemplated, the secondary alcohol-derived compounds are preferred for use in accordance with this invention.

Surface active materials of the class alkylphenoxy polyethoxyethanol (sometimes referred to as ethoxylated alkyl phenols) are widely available surface active materials. The most preferred compounds of this class are those in which the alkyl substituent on the phenol group is tertiary octyl and in which the ratio of moles of ethylene oxide per mole of hydrophobe is in the range 7–8. However, the compounds of this class are generally not the preferred wax emulsifiers for use in accordance with this invention. Such materials are commercially available under the trademark "Triton X–114."

However, compounds of the ethoxylated alkyl phenol class having other alkyl groups, such as octyl, nonyl, and in which the alkyl is linear, or in which the phenol is dialkyl substituted, are also contemplated for use in accordance with this invention. A nonyl alkyl phenol with a 10.5:1 ethyleneoxy-alkyl phenol ratio is "Igepal CO–710" (T.M.). A nonyl alkyl phenol having a 20:1 ratio of ethyleneoxy:alkyl phenol of 20:1 is "Surphonic N–200" (T.M.). An octyl phenol-derived compound of this class having an ethyleneoxy:octyl phenol ratio of 16:1 is "Triton X–165" (T.M.).

The terms "coco" or "coconut" are used herein in connection with the identification of emulsifiers which are eminently satisfactory for use in accordance with this invention. As used herein the terms "coco," or "coconut" and particularly the terms "coconut acids" or "coco acids" refer to the mixed fatty acid derived from coconut oil. It is known that the acid constituent of coco acids are de-derived from trimyristin, trilaurin, tripalmitin, tristearin, and also various other glycerides derived from coconut oil. Thus, the term coco acid refers to the mixture of acids derived from the hydrolysis of the coconut oil-derived glycerides and includes myristic acid, lauric acid, palmitic acid, stearic acid, etc. It is contemplated that saturated fatty acids in the range $C_{10}$–$C_{18}$ are usable in accordance with this invention as starting materials in the manufacture of the fatty acid alkanol-amide emulsifier of this invention, although mixtures of some of these fatty acids, and most preferably the mixtures which correspond to the ratios found in coco acid are contemplated as preferred starting materials. Preferred emulsifiers of this class are those in which the vegetable fatty acid amides are converted to diethanol amide condensates in which the amide/acid ratio is 2:1. These compounds are generally water soluble liquids and are commercially available for example under the trademarks "Clindrol 200 CGN," "Clindrol 206 CGN," "Aminol COR–2," "Ardet DC," "Calamide C," "Emid 6530," "Hartamide K," and "Marsamide 40." The gross composition of the coco diethanolamine condensates having a 2/1 amine/acid ratio is represented by the formula

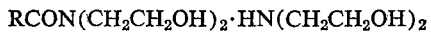

$$RCON(CH_2CH_2OH)_2 \cdot HN(CH_2CH_2OH)_2$$

as indicated by the ratio of amine to acid.

Illustrative of other diethanol amine condensates of fatty acids which are contemplated for use in accordance with this invention include those derived from lauric acid, e.g. commercially available mixtures available under the trademarks "Ardet LDA 9095," "Clindrol 200 L," "Condensate PE," "Culveride SAL 9," "Emid 6540," and "Hartamide LX." An example of an emulsifier of this class derived from myristic acid is available under the trademark "Condensate PM."

Given this disclosure, it will be relatively simple to determine the optimum wax-emulsifier level for a particular emulsifier in the beater for a given rate of addition of waxed paper. The wax emulsifier of this invention is added in an amount sufficient to emulsify the wax and will be proportionate to the amount of wax charged. It will be appreciated that the amount of wax charged to the papermaking system in accordance with this invention will depend in part on the amount of waxed paper being added and also, in part, on the amount of wax present in the waxed paper being added. It will depend too on the type of wax being employed. In accordance with this invention the level of wax dispersant is increased or decreased depending on the rate of addition of the wax to the beater, as the rate of addition of wax increases or decreases respectively. Generally speaking nonionic surfactant is added in an effective amount, preferably in the range 5 to 50 pounds per ton of waxed paper, although a larger amount, e.g. 100–200 pounds per ton, can be used if desired.

EXAMPLE 1

Wax broke paper trimmings are charged directly to a fiber slurry in a 2,000 lb. pulper and a wax emulsifier "Tergitol 15–S–3" which was described hereinbefore was added thereto at the rate of 30 lbs. of emulsifier per ton of waxed paper charged. The resulting admixture is heated to a temperature of 180° F., which temperature is above the melting point of the wax on the paper. The contents of the beater are thoroughly beaten and agitated during the heating cycle. The waxed paper is gradually defibered with the wax on the paper being released in the aqueous phase. The resulting fiber slurry-wax mixture is used in a Fourdrinier papermaking process after having been diluted to 0.5% consistency with cold water. Some of the wax appears to remain emulsified. Wax does not cause any sticking or buildup in any of the machinery or on any of the felt and yet some of the wax is redeposited, like size, with the paper sheet. The emulsified wax passing through to the white water system remains emulsified. The relatively small amount of wax on the sheet does not agglomerate on drying, with the result that no wax spots appear on the product, and the wax does not interfere with printing of the paper.

EXAMPLE 2

The purpose of this example is to set forth a simple laboratory test by which anyone with ordinary skill in the art can determine emulsifiers which are contemplated for use in accordance with the present invention. Thus, in its broadest aspects, emulsifiers for use in accordance with this invention are those which meet the standards of the tests which are set forth herein.

Procedure: 10 grams of waxed paper (17% wax content), e.g. Scott Cut-Rite (T.M.), are cut into one inch squares and added to a large beaker. Three hundred cc. of tap water is added followed by an amount of emulsifier. In this example procedure, it is preferred that three separate respective tests be run concurrently in which each emulsifier is tested at three respective levels, i.e. 0.125 grams, 0.50 grams and 1.0 grams per waxed paper-tap water mixture. These emulsifier levels correspond to 25, 100 and 200 lbs. respectively of emulsifier per ton of waxed paper.

The mixture is heated (10° F. rise per minute) while stirring constantly. The temperature is held finally at 175–180° F. for 15 minutes while stirring. The mixture is transferred to a warm Waring Blender. The blender is allowed to disintegrate the pulp for one minute at slow speed. Observation is made as to whether the wax is emulsified at this point. The pulp liquor is poured into a large beaker followed by 1500 cc. of room temperature tap water, which is admixed therewith.

The pulp liquor is stirred gently for two minutes and then poured into a Büchner funnel with a false bottom made of 40 mesh, 0.10 inch stainless steel wire and equipped with a suction flask.

Suction is applied to the flask to relieve the pulp of as much water as possible. The white water is poured into a glass beaker and allowed to stand undisturbed for 24 hours. Additional observations for emulsification stability at 4 hours after filtration, and 24 hours after filtration are made and recorded. Foaming characteristics are also observed and recorded. The results of tests for the emulsifier tested in this example are set forth in Table I.

TABLE I

Polyethylene glycol ether of aliphatic alcohol (Tergitol 15-S-5)

| | + 25#/ton | 100#/ton | 200#/ton |
|---|---|---|---|
| Emulsification at 180° F., 3% consistency. | Yes | Yes | Yes |
| Emulsion stability after 4 hrs. at room temp., 1:6 dilution. | No | Yes | Yes |
| Emulsion stability after 24 hrs. at room temp., 1:6 dilution. | No | Yes | Yes |
| Foaming characteristics, 5% consistency. | | Very little foam. | |
| Foaming characteristics, ½% consistency. | | do | |

EXAMPLE 3

The test procedure of Example 2 was repeated except that the emulsifier of Example 2 was replaced by an alkyl phenoxy polyethoxy ethanol emulsifier which is commercially available under the trade name "Triton X–114." This material was described in detail hereinbefore. The results of the tests are reported in Table II.

TABLE II

Octyl phenoxy polyethoxy ethanol (Triton X–114)

| | 25#/ton | 100#/ton | 200#/ton |
|---|---|---|---|
| Emulsification at 180° F., 3% consistency. | Yes | Yes | Yes. |
| Emulsion stability after 4 hrs. at room temp., 1:6 dilution. | No | Yes | Yes. |
| Emulsion stability after 24 hrs. at room temp., 1:6 dilution. | No | No | Yes. |
| Foaming characteristics, 5% consistency. | | | Foams. |
| Foaming characteristics, ½% consistency. | | | Very little foam. |

EXAMPLE 4

The procedure of Example 2 is repeated except that instead of the emulsifier of Example 2, the tests of this example were conducted using a coco alkanol amide which is commercially available as "Clindrol 206 CGN," and which has been described in detail hereinbefore. The results of the tests are reported in Table III.

TABLE III

Coconut alkanol amide (Clindrol 206 CGN)

| | 25#/ton | 100#/ton | 200#/ton |
|---|---|---|---|
| Emulsification at 180° F., 3% consistency. | Yes | Yes | Yes. |
| Emulsion stability after 4 hrs. at room temp., 1:6 dilution. | Yes | Yes | Yes. |
| Emulsion stability after 24 hrs. at room temp., 1:6 dilution. | Yes | Yes | Yes. |
| Foaming characteristics, 5% consistency. | | | Foams. |
| Foaming characteristics, ½% consistency. | | | do. |

EXAMPLE 5

The procedure of Example 2 was repeated except that a complex nonionic surfactant was used as the emulsifier. This surfactant is commercially available under the trade name "Triton BG–5." Under the conditions of the test no emulsification occurred at 180° F. and consequently no stability tests were run.

EXAMPLE 6

In this example the procedure of Example 2 was repeated except that instead of the emulsifier of Example 1 a complex amine polyglycol condensate (nonionic) emulsifier commercially available under the trademark "Triton CF–32" was used. In this test no substantial emulsification occurred, even at 180° F., and consequently no emulsion stability tests were run.

EXAMPLE 7

In the test of this example the procedure of Example 2 was repeated except that instead of the emulsifier of Example 2, a condensed propylene oxide with propylene glycol was used as the emulsifier. The material tested is commercially available under the trademark "Pluronic L 62 LF." Under the conditions of the test no substantial emulsification was observed at 180° F. and consequently emulsion stability tests were not run.

It is noted that the complex nonionic surfactants "Triton BG–5," the complex amine polyglycol condensate nonionic "Triton CF–32" and the condensate of propylene oxide with propylene glycol, "Pluronic L 62 LS" did not provide initial emulsification regardless of the concentration of the surfactant employed, and consequently no data is shown on the emulsion stability. For comparison purposes, "Tergitol 15–S–7" gives performance which is equivalent to coconut alkanol amide ("Clindrol 206 CGN").

Thus, the complex nonionic surfactant "Triton BG–5," the complex amine polyglycol condensate nonionic surfactant ("Triton TF–32") and the condensate polypropylene oxide with polypropylene glycol ("Pluronic L–2 LS") are not contemplated for use in accordance with this invention in view of the test results of Examples 5, 6, and 7 herein. Moreover "Tergitol 15–S–5" and "Triton X–114" are to be classified as preferred emulsifiers in view of the results of tests of Examples 2 and 3, respectively and "Clindrol 206 CGN" is to be classified as a most preferred emulsifier in view of the test results of Example 4.

The pH conditions in which the method of this invention are carried out can vary over a wide range from acidic to basic, e.g. from pH below 2 to pH above 12.

EXAMPLE 8

The procedure of Example 1 is repeated except that a 2,000 lb. mixture of waxed paper and brown wet strength paper which includes a formaldehyde melamine resin is charged to a beater partially filled with water. The temperature is raised gradually from ambient temperature to 150° F. with the beater operating. Emulsifier is added in an amount sufficient to provide 50 lbs. of emulsifier per ton based on the fiber. The emulsifier used in this example is a formulated emulsifier which is made up of 86% "Tergitol 15–S–5," which was described hereinbefore, 10% isopropyl alcohol and 4% water. The beater is filled with water after the pulp disintegrates and the resulting admixture is steamed with the temperature rising to 170–180° F., at which temperature, the wax melts and is emulsified. The pH of the contents is dropped to 2.0 by addition of sulfuric acid and from time to time the pulp is examined and the beating and treatment is continued until the fibers are separated. The contents of the beater are adjusted to pH 6 and the resulting mixture, including pulp, emulsifier, and wax emulsion are transferred to a stock chest, thence to a conventional Jordan treatment, thence to a second stock chest and diluted to ½% consistency. The resulting admixture is used directly in papermaking process. Although some of the wax remained in the emulsion going into the white water, some of the wax was redeposited with the paper. The procedure of this example can be used, for example, to produce a ½ inch thick wet-lap sheet on a small sheet-forming machine.

The procedure of this example is also eminently satisfactory for use at pH 6, the pH encountered when the formulated emulsifier of this example is used, when a typical waxed paper, e.g. waste Scott Cut-Rite paper, is to be reclaimed.

EXAMPLE 9

This example is provided for the purpose of illustrating manufacturing tests of this invention using equipment having a total production capacity of 175–200 tons per day. The equipment used in this test is a conventional cylinder machine in which the individual plies of the board are formed on a respective cylinder covered with wire cloth while the cylinder is rotated partially submerged in a stock suspension and the plies, so formed, make up a board product. In this test, pulping was carried out in a stainless steel hydropulper of 9,000–10,000 gallon capacity with a Vokes rotor. After the pulping the defibered stock is pumped into a drop chest, a storage chest, Jordans and machine chests for use in the production of "underliner." Throughout this test the amount of emulsifier added, on an air-dried ton of waxed waste paper was maintained at 1.5–2%, based on pulp and normally ran between 30 to 40 lbs. of emulsifier per ton of waxed waste paper. The emulsifier used in this test was a mixture of a polyethylene glycol ether of aliphatic alcohol ("Tergitol 15–S–5"), isopropyl alcohol and water in an amount of 86%, 10% and 4%, respectively, based on the weight of the emulsifier mixture. It was desired that the temperature of the pulper during the time held at temperature referred to in the table, would not be lower than 175–180° F. It was also desired that the specified elevated temperatures should be maintained for at least 30 minutes agitation time. The procedure employed was generally in accordance with that of Example 1 and a series of fourteen runs were made. The conditions for each run are reported in Table IV.

TABLE IV

| Hydro-pulper number | Pulping conditions | | Charge pounds | | Chemicals on wax paper basis, percent |
|---|---|---|---|---|---|
| | Total time | Time at temp. | Paper or board (unwaxed) | Board (waxed) | |
| I | 1:30 | 1 hr. (170–180) | | 3,960 | 2.0 |
| II | 2:40 | 0.40 (176–180) | | 4,452 | 2.0 |
| III | 2:15 | 0.55 (180) | 2,100 | 2,100 | 1.65 |
| IV | 2:05 | 0.30 (170–180) | 3,330 | 1,500 | 2.3 |
| V | 3:05 | 1.35 (175–180) | 2,450 | 1,600 | 2.0 |
| VI | 1:45 | 0.45 (173–180) | 2,000 | 2,000 | 2.0 |
| VII | 2:30 | 0.35 (176–182) | 2,000 | 2,275 | 2.0 |
| VIII | 1:50 | 0.35 (174–180) | 3,400 | 2,000 | 2.0 |
| IX | 1:25 | 0.30 (172–180) | 2,000 | 1,570 | 2.0 |
| X | 1:00 | 0.30 (172–188) | 2,140 | 1,600 | 1.6 |
| XI | 2:15 | 0.45 (172–180) | 2,700 | 1,580 | 3.0 |
| XII | 2:35 | 0.55 (176–180) | 3,000 | 1,500 | 2.0 |
| XIII | 2:15 | 0.30 (176–188) | 3,000 | 1,500 | 2.0 |
| XIV | 1:55 | 0.45 (176–180) | 3,000 | 1,120 | 2.0 |

It is noted that in the first two runs of the test, a furnish containing 100% waxed board was used. In these tests resulting pulp was subsequently blended with 50% of pulp made of conventional material. In the remaining runs set forth on Table IV the beater runs utilized a charge made of the mixture of unwaxed and waxed materials as set forth in the table. Samples were collected from the cylinder molds of the underliner vat, from the white water below the board machine, and at the dry end of the board machine (sheeter). The machine trial went well and the underliner ply produced using the product of this invention was entirely satisfactory for commercial purposes. During the course of the series of runs eight samples of "white water" were obtained. Upon the conclusion of the series of tests each of the individual samples was homogenized in a Waring Blender. A two-hundred milliliter aliquot of each sample was collected and evaporated in a water bath and dried in a drying oven. In each instance the residue was separated from the bottom of the container with a spatula and the residue was extracted at least four times with 1,1,1-trichloroethane according to TAPPI standard T 405 ts 63. The extract was evaporated in a water bath, dried to constant weight at 105±3° C. in a drying oven and weighted using an analytical balance. The data thus obtained showed that the white water which was collected prior to the test had 200 p.p.m. extractives, and that during the test the level of extractives gradually rose to 700–800 p.p.m. at which level it appeared to remain constant and the wax remained dispersed. Samples of the board collected during the trial were cut into strips and soaked in water overnight. The next day the two white plies (top liner and underliner) were peeled off and dried in air. Two gram samples were extracted and tested according to TAPPI standard 405 ts 63 with trichloroethane. The extractives immediately before and after the test were approximately 1.5% whereas during the test the samples remained constant between 1.0 and 1.25% extractives. The test results showed that the amount of extractives in board (mostly wax) stays almost constant. The plies produced in this test, in accordance with this invention, were free of wax specks, etc.

When the procedure of Example 9 was repeated to produce a top liner from a mixture of 25% waxed ice cream cartons for 75% weight pulp the average wax content of the top liner produced therefrom was about 0.7% wax. During the same test a filler produced from a mixture of 50% waxed ice cream cartons plus waste paper, the filler averaged 0.9% wax. (The waxed ice cream cartons contained approximately 5% wax as an outer coat.) In this test the top liner retained about 63% of the initial wax content and the filler part of the board contained above 40% of the initial wax content charged to the respective beater. The waxed paperboard manufactured in this test was free of wax specks and other undesirable characteristics.

EXAMPLE 10

The procedure of Example 2 was repeated except that a mixture of nonionic surfactant was used as the emulsifier. The mixture of this example consisted of a 1:1 weight ratio of commercially available materials identified by the trademarks "Igepal CO 430," and "Tergitol 15–S–7," respectively. "Igepal CO 430" is an ethoxylated nonyl phenol and "Tergitol 15–S–7" is an ethoxylated linear alcohol in which the alcohol moiety is derived from a mixture of $C_{11}$–$C_{15}$ alcohols. The results of the tests are reported in Table V.

It is apparent from the data of Table V that mixtures of preferred wax dispersants are eminently satisfactory for use in accordance with this invention.

TABLE V

1:1 weight mixture of nonyl phenoxy polyethoxy ethanol and linear alkyl polyethoxyethanol (Igepal CO 430, and Tergitol 15–S–7, respectively)

| | 25#/ton | 100#/ton | 200#/ton |
|---|---|---|---|
| Emulsification at 180° F., 3% consistency. | Yes | Yes | Yes |
| Emulsion stability after 4 hrs. at room temp., 1:6 dilution. | Yes | Yes | Yes |
| Emulsion stability after 24 hrs. at room temp., 1:6 dilution. | Yes | Yes | Yes |
| Foaming characteristics, 5% consistency. | | | Very little foam. |
| Foaming characteristics, ½% consistency. | | | do |

In accordance with this invention the process is eminently satisfactory for use in connection with adjuvants such as alum which provide a pH 3–7 or with strong mineral acids such as hydrochloric or sulfuric acid, as well as in alkaline mediums.

When the procedure of Example 1 is carried out with 100% waxed paper containing up to about 20% wax the resulting paper or board can conveniently have 2–4% retained wax. However the stock can be made up from 100% waxed paper or any ratio with non-waxed stock. For example 90% non-waxed stock with 10% waxed stock is eminently satisfactory. In such embodiments the level of wax which is present in the resulting paper product is commonly less than 1½% and yet substantially no wax is passed thereinto the white water. This is also particularly significant since many consider 1½% to be the maximum wax level which can be present if the product is to be printed.

Generally speaking the amount of time to which the wax stock is subjected to agitation, e.g. in the beater, is whatever time is necessary to free the fibers, and in the vast majority of instances a period of time in the range 15 minutes to two hours is eminently satisfactory, and a period of about ½ hour at a temperature above the melting point of the wax being preferred.

It is noted that in those embodiments in which the wax emulsion is admixed with large quantities of cold or room temperature water, e.g. at a 1:6 dilution, the wax is frozen (many waxes melt in the range 130–150° F.) and, while it is not intended that the invention be limited by any theories, it is believed that the solidification of the emulsified phase and a stabilization of the solidified emulsified wax accounts, in part, for the desirable change in physical characteristics which result in unexpectedly superior physical properties of the resulting wax-containing product, and which result in substantial elimination of contamination or buildup of wax in those structures of the system in which the wax-containing aqueous phase is in contact. This is particularly noticeable in that equipment which is cold (or at ambient temperature) when the hot wax-containing slurries of this invention are charged thereto.

In those embodiments in which Vaseline or petrolatum-containing papers are used in the method of this invention, the Vaseline or petrolatum is released into the aqueous phase along with the fibers, during the agitation of the paper in the pulper. The released Vaseline or petrolatum does not undergo solidification when the aqueous mixture is subsequently admixed with large quantities of cold or room temperature water. Nonetheless it has been found that in such embodiments some of the hydrocarbon is co-deposited with the fibers in the sheet-making operation, but nonetheless, the deposited hydrocarbon is in a finely dispersed non-agglomerating condition so that no shiny spots appear in the product, and moreover there is substantially no contamination or buildup of hydrocarbon materials in those equipment structures of the system in which the aqueous phase is in contact.

It is also contemplated that the method of this invention can be used in series with other wax-removing methods, e.g. methods known in the prior art in which a major portion of wax is heated, and separated by flotation as a supernatent liquid phase from the bulk of the fiber. It is contemplated that the method of this invention would be used in series with solvent extraction or mechanical processes for easy removal with the thus, partially purified fibers to convert the physical characteristics of the remaining wax to those characteristics which provide the highly advantageous results described hereinbefore.

Wherever desired, known antifoam agents can be used in the practice of this invention.

One of the unexpected advantages of wax-containing sheets or plys made in accordance with this invention, in which only dispersed, non-agglomerated wax is present, is the fact that such sheets or plys can be used in lamination over relatively low-grade sheets or plys, for example as a top liner or under liner over plys which contain dark colored hydrocarbon soluble contaminants. In the prior art, unsightly strike-through of the dark materials would occur through waxy spots on the top liner or underliner. No such strike-through occurs through the wax-containing sheets and plys made in accordance with this invention.

What is claimed is:

1. A method of repulping waxed fibrous stock material such as waxed paper and waxed paperboard comprising charging waxed fibrous stock material or mixtures containing waxed fibrous material, stock and non-waxed stock material to a pulper, agitating said waxed fibrous material with water containing a dewaxing agent consisting essentially of a water soluble nonionic emulsifier which meets the standard set forth hereinafter, subjecting the resulting admixture to mechanical agitation while heating said admixture to a temperature sufficiently high to melt the wax in said fibrous material, thereby forming a slurry containing released fiber and wax, said emulsifier being present in said water in an effective amount sufficient to release substantially all of the wax in said waxed fibrous material and, thereafter charging released fiber and wax in a slurry to a product-forming fiber-liquid separator wherein said fibers are formed into a fibrous mat; said emulsifier being a water soluble nonionic emulsifier which meets the standard provided by the test comprising the following steps: (1) preparing an initial admixture consisting essentially of water, waxed paper, and emulsifier, in which admixture waxed paper is present in an amount of 3.3% by weight based on the weight of the water, and in which the waxed paper has a wax content of 17% by weight, and wherein the emulsifier is present in said initial admixture in an amount of 0.333% by weight based on the weight of the water in the initial admixture; (2) heating the resulting admixture to a temperature in the range 175–180° F. and stirring the heated admixture for 15 minutes while in that temperature range; (3) adding ambient room temperature water to said admixture in an amount which is five times the volume of the admixture and admixing the added water therewith to provide a diluted admixture having an overall temperature which is below the melting point of the wax content thereof; (4) immediately filtering the resulting admixture through a 40 mesh screen to provide a diluted suspension and permitting the resulting diluted filtrate to stand for 24 hours at ambient room temperature, and observing the diluted filtrate suspension to determine whether said suspension is stable 24 hours after dilution; wherein the said emulsifier meets said standard if the diluted filtrate suspension of step (4) remains stable at ambient room temperature for 24 hours.

2. The method of claim 1 wherein said effective amount of said emulsifier ranges from 25 pounds to 200 pounds of emulsifier per ton of waxed fibrous stock material.

3. A method of repulping waxed fibrous stock material such as waxed paper and waxed paperboard comprising charging waxed fibrous stock material or mixtures containing waxed paper or paperboard and non-waxed stock material to a pulper, admixing said waxed fibrous material with water containing an effective amount of a dewaxing agent consisting essentially of a water soluble nonionic wax emulsifier selected from the group consisting of polyethylene glycol ethers of hydrophobic alcohols, alkyl phenoxy polyethoxy-ethanols, fatty acid alkanol amides, and mixtures thereof, subjecting the resulting admixture to mechanical agitation while heating said admixture to a temperature sufficiently high to melt the wax in said wax fibrous material, thereby forming a slurry containing released fiber and wax, said effective amount of said emulsifier present in said water being an amount sufficient to release substantially all of the wax in the waxed fibrous material when heated to a temperature above the melting point of the wax and, thereafter charging said released fiber and wax in a slurry to a product-forming fiber-liquid separator wherein said fibers are formed into a fibrous mat; said emulsifier meeting the standard set forth hereinafter when tested according to the procedure comprising the steps of: (1) forming an initial admixture consisting essentially of water, waxed paper and the emulsifier in which the waxed paper is present in an amount of 3.3% by weight based on the weight of the water, and in which the waxed paper has a wax content of 17% by weight, and wherein the emulsifier is present in an amount of 0.166% based on the weight of the water in the initial admixture; (2) heating the resulting admixture to a temperature in the range 175–180° F. and stirring the heated admixture for a 15 minute time period at that temperature; (3) adding ambient room temperature water to said admixture in an amount which is five times the volume of the admixture and admixing the added water therewith to provide a diluted admixture having an overall temperature which is below the melting point of the wax content thereof; (4) immediately filtering the resulting diluted admixture through a 40 mesh screen to provide a diluted suspension and permitting the resulting diluted filtrate to stand for 24 hours at ambient room temperature, and observing the diluted filtrate suspension to determine whether said suspension is stable 24 hours after dilution; wherein the said emulsifier meets said standard if the diluted filtrate suspension of step (4) remains stable at ambient room temperature for 24 hours.

4. The method of claim 3 wherein said effective amount of said emulsifier ranges from 25 pounds to 200 pounds of emulsifier per ton of waxed fibrous stock material.

5. The method of claim 3 wherein the emulsifier is an ethoxylated aliphatic alcohol, wherein the alcohol is a hydrophobic secondary alcohol having from 11 to 15 carbon atoms and wherein the average molar ratio of ethylene oxide to hydrophobic alcohol is in the range from 5:1 to 15:1.

6. The process of claim 5 wherein the average molar ratio of ethylene oxide to hydrophobic alcohol is in the range of about 9:1.

7. The method of claim 3 wherein the emulsifier is an ethoxylated alkyl phenol in which the alkyl substituent is tertiary octyl, and in which the ratio of moles of ethylene oxide per mole of alkyl phenol is in the range 7–8, inclusive.

8. The process of claim 3 wherein the emulsifier is a fatty acid amide diethanol amine condensate derived from a member selected from the group consisting of myristic acid, lauric acid, palmitic acid, stearic acid, and mixtures thereof.

9. A method of reclaiming waxed fibrous stock material in a Fourdrinier papermaking process comprising charging waxed fibrous stock material such as waxed paper and waxed paperboard or mixtures containing waxed paper or waxed paperboard and non-waxed stock material to a pulper, admixing said stock material with water containing an effective amount of a dewaxing agent consisting essentially of a water soluble nonionic wax emulsifier selected from the group consisting of polyethylene glycol ethers of hydrophobic alcohols, alkyl phenoxy polyethoxyethanols, fatty acid alkanol amides, and mixtures thereof, heating the admixture to a temperature sufficiently high to melt the wax in said waxed fibrous material, subjecting the resulting admixture to mechanical agitation, thereby forming a slurry containing released fiber and wax, said effective amount of emulsifier present in said water being an amount sufficient to release substantially all of the wax in the waxed fibrous stock material when heated to a temperature above the melting point of the wax; admixing said slurry with a quantity of water sufficient to reduce the consistency of the resulting diluted slurry to that which is suitable for use in a Fourdrinier papermaking process; and, charging the resulting diluted slurry to the papermaking wire in a Fourdrinier papermaking operation; wherein said emulsifier meets the standard set forth hereinafter when tested according to the procedure comprising the steps: (1) forming an initial mixture consisting essentially of water, waxed paper and the emulsifier in which the waxed paper is present in an amount of 3.3% by weight based on the weight of the water, and in which the waxed paper has a wax content of 17% by weight, and wherein the emulsifier is present in an amount 0.333% based on the weight of the water in the initial mixture; (2) heating the resulting admixture to a temperature in the range 175–180° F., stirring the heated mixture for a 15 minute time period at that temperature; (3) adding ambient room temperature water to said admixture in an amount which is five times the volume of the admixture and admixing the added water therewith to provide a diluted admixture having an overall temperature which is below the melting point of the wax content thereof; (4) immediately filtering the resulting diluted admixture through a 40 mesh screen to provide a diluted suspension and permitting the resulting diluted filtrate to stand for 24 hours at ambient room temperature, and observing the diluted filtrate suspension to determine whether said suspension is stable 24 hours after dilution; wherein the said emulsifier meets said standard if the diluted filtrate suspension of step (4) remains stable at ambient room temperature for 24 hours.

10. The method of claim 9 wherein said effective amount of said emulsifier ranges from 25 to 200 pounds of emulsifier per ton of waxed fibrous stock material.

11. The method of claim 9 wherein the emulsifier is an ethoxylated aliphatic alcohol, wherein the alcohol is a hydrophobic secondary alcohol having from 11 to 15 carbon atoms and wherein the average molar ratio of ethylene oxide to hydrophobic alcohol is in the range from 5:1 to 15:1.

12. The process of claim 11 wherein the average molar ratio of ethylene oxide to hydrophobic alcohol is in the range of about 9:1.

13. The method of claim 9 wherein the emulsifier is an ethoxylated alkyl phenol in which the alkyl substituent is tertiary octyl, and in which the ratio of moles of ethylene oxide per mole of alkyl phenol is in the range 7–8, inclusive.

14. The process of claim 9 wherein the emulsifier is a fatty acid amide diethanol amine condensate derived from a member selected from the group consisting of myristic acid, lauric acid, palmitic acid, stearic acid, and mixtures thereof.

15. A method of reclaiming waxed fibrous stock material such as waxed paper and waxed paperboard, in a cylinder paper or boardmaking process comprising: charging waxed fibrous stock material mixtures containing waxed paper or waxed paperboard and non-waxed stock material to a pulper, admixing said stock material with water containing an effective amount of a dewaxing agent consisting essentially of a water soluble nonionic wax emulsifier selected from the group consisting of polyethylene glycol ethers of hydrophobic alcohols, alkyl phenoxy polyethoxyethanols, fatty acid alkanol amides, and mixtures thereof, heating the admixture to a temperature sufficiently high to melt the wax in said waxed fibrous material, subjecting the resulting mixture to mechanical agitation, thereby forming a heated slurry containing released wax and fiber, said effective amount of said emulsifier present in said water being an amount sufficient to release substantially all of the wax in the waxed fibrous stock material when heated to a temperature of above the melting point of the wax; admixing said heated slurry with a quantity of water sufficient to reduce the consistency of the resulting diluted slurry to that suitable for use in a cylinder paper or boardmaking process, and charging the resulting diluted slurry to a cylinder apparatus and drawing the emulsion slurry against a cylinder screen to produce a sheet thereon; wherein said emulsifier meets the standard set forth hereinafter when tested according to the procedure comprising the steps; (1) forming an initial admixture consisting essentially of water, waxed paper, and the emulsifier, in which the waxed paper is present in an amount of 3.3% based on the weight of the water, and in which the waxed paper has a wax content of 17% by weight, and wherein the emulsifier is present in an amount of 0.333% by weight based on the weight of the water in the initial mixture; (2) heating the resulting admixture to a temperature in the range 175–180° F. and stirring the heated admixture for a 15 minute time period at that temperature; (3) adding ambient room temperature water to said admixture in an amount which is five times the volume of the admixture and admixing the added water therewith to provide a diluted admixture having an overall temperature which is below the melting point of the wax content thereof; (4) immediately filtering the resulting admixture through a 40 mesh screen to provide a diluted suspension and permitting the resulting diluted filtrate to stand for 24 hours at ambient room temperature, and observing the diluted filtrate suspension to determine whether said suspension is stable 24 hours after dilution; wherein the said emulsifier meets said standard if the diluted filtrate suspension of step (4) remains stable at ambient room temperature for 24 hours.

16. The method of claim 15 wherein said effective amount of emulsifier ranges from 25 pounds to 200 pounds of emulsifier per ton of waxed fibrous stock material.

17. The method of claim 15 wherein the emulsifier is an ethoxylated aliphatic alcohol, wherein the alcohol is a hydrophobic secondary alcohol having from 11 to 15 carbon atoms and wherein the average molar ratio of ethylene oxide to hydrophobic alcohol is in the range from 5:1 to 15:1.

18. The process of claim 17 wherein the average molar ratio of ethylene oxide to hydrophobic alcohol is in the range of about 9:1.

19. The method of claim 15 wherein the emulsifier is an ethoxylated alkyl phenol in which the alkyl substituent is tertiary octyl, and in which the ratio of moles of ethylene oxide per mole of alkyl phenol is in the range 7–8, inclusive.

20. The process of claim 15 wherein the emulsifier is a fatty acid amide diethanol amine condensate derived from a member selected from the group consisting of myristic acid, lauric acid, palmitic acid, stearic acid, and mixtures thereof.

21. A method of reclaiming waxed fibrous stock material such as waxed paper and waxed paperboard in a wet-lap making process comprising charging waxed stock fibrous material or mixtures containing waxed paper or waxed paperboard and non-waxed stock to a pulper, admixing said stock material with water containing an effective amount of a dewaxing agent consisting essentially of a water soluble nonionic wax emulsifier selected from the group consisting of polyethylene glycol ethers of hydrophobic alcohols, alkyl phenoxy polyethoxyethanols, fatty acid alkanol amides, and mixtures thereof, heating the resulting admixture to a temperature sufficiently high to melt the wax in said fibrous material, subjecting the resulting admixture to mechanical agitation, thereby forming a slurry containing released wax and fiber, said effective amount of emulsifier present in said water being an amount sufficient to release substantially all of the wax in the waxed fibrous stock material when heated to a temperature above the melting point of the wax, charging the released fiber to a wet-lap sheet-making screen and producing a sheet of wet-lap therefrom; wherein said emulsifier meets the standard set forth hereinafter when tested according to the procedure comprising the steps: (1) forming an initial admixture consisting essentially of water, waxed paper and the emulsifier, in which the waxed paper is present in an amount of 3.3% by weight based on the weight of the water, and in which the waxed paper has a wax content of 17% by weight, and wherein the emulsifier is present in an amount of 0.333% by weight based on the weight of the water in the initial mixture; (2) heating the resulting admixture to a temperature in the range 175–180° F. and stirring the heated admixture for a 15 minute time period at that temperature; (3) adding ambient room temperature water to said admixture in an amount which is five times the volume of the admixture and admixing the added water therewith to provide a diluted admixture having an overall temperature which is below the melting point of the wax content thereof; (4) immediately filtering the resulting diluted admixture through a 40 mesh screen to provide a diluted suspension and permitting the resulting diluted filtrate to stand for 24 hours at ambient room temperature, and observing the diluted filtrate suspension to determine whether said suspension is stable 24 hours after dilution; wherein the said emulsifier meets said standard if the diluted filtrate suspension of step (4) remains stable at ambient room temperature for 24 hours.

22. The method of claim 21 wherein said effective amount of emulsifier ranges from approximately 25 pounds to 200 pounds of emulsifier per ton of waxed fibrous stock material.

23. The method of claim 21 wherein the emulsifier is an ethoxylated aliphatic alcohol, wherein the alcohol is a hydrophobic secondary alcohol having from 11 to 15 carbon atoms and wherein the average molar ratio of ethylene oxide to hydrophobic alcohol is in the range from 5:1 to 15:1.

24. The process of claim 23 wherein the average molar ratio of ethylene oxide to hydrophobic alcohol is in the range of about 9:1.

25. The method of claim 21 wherein the emulsifier is an ethoxylated alkyl phenol in which the alkyl substituent is tertiary octyl, and in which the ratio of moles of ethylene oxide per mole of alkyl phenol is in the range 7–8, inclusive.

26. The process of claim 21 wherein the emulsifier is a fatty acid amide diethanol amine condensate derived from a member selected from the group consisting of myristic acid, lauric acid, palmitic acid, stearic acid, and mixtures thereof.

27. A method of repulping waxed fibrous stock material such as waxed paper and waxed paperboard comprising charging waxed fibrous stock material to a pulper, agitating said waxed fibrous material with water containing a dewaxing agent consisting essentially of a water soluble nonionic emulsifier which meets the standard set forth hereinafter, subjecting the resulting admixture to mechanical agitation while heating said admixture to a temperature sufficiently high to melt the wax in said fibrous material, thereby forming a slurry containing released fiber and wax, said emulsifier being present in said water in an effective amount sufficient to release substantially all of the wax in said waxed fibrous material and, thereafter charging released fiber and wax in a slurry to a product-forming fiber-liquid separator wherein said fibers are formed into a fibrous mat; said emulsifier being a water soluble nonionic emulsifier which meets the standard provided by the test comprising the following steps: (1) preparing an initial admixture consisting essentially of water, waxed paper, and emulsifier, in which admixture waxed paper is present in an amount of 3.3% by weight based on the weight of the water, and in which the waxed paper has a wax content of 17% by weight, and wherein the emulsifier is present in said initial admixture in an amount of 0.333% by weight based on the weight of the water in the initial admixture; (2) heating the resulting admixture to a temperature in the range 175–180° F. and stirring the heated admixture for 15 minutes while in that temperature range; (3) adding ambient room temperature water to said admixture in an amount which is five times the volume of the admixture and admixing the added water therewith to provide a diluted admixture having an overall temperature which is below the melting point of the wax content thereof; (4) immediately filtering the resulting admixture through a 40 mesh screen to provide a diluted suspension and permitting the resulting diluted filtrate to stand for 24 hours at ambient room temperature, and observing the diluted filtrate suspension to determine whether said suspension is stable 24 hours after dilution; wherein the said emulsifier meets said standard if the diluted filtrate suspension of step (4) remains stable at ambient room temperature for 24 hours.

28. A method of repulping waxed fibrous stock material such as waxed paper and waxed paperboard comprising charged waxed fibrous stock material or mixtures containing waxed fibrous material, stock and non-waxed stock material to a pulper, said mixture containing between 10% and 100% waxed fibrous material by weight based on the weight of the stock material, agitating said waxed fibrous material with water containing a dewaxing agent consisting essentially of a water soluble nonionic emulsifier which meets the standard set forth hereinafter, subjecting the resulting admixture to mechanical agitation while heating said admixture to a temperature sufficiently high to melt the wax in said fibrous material, thereby forming a slurry containing released fiber and wax, said emulsifier being present in said water in an effective amount sufficient to release substantially all of the wax in said waxed fibrous material and, thereafter charging released fiber and wax in a slurry to a product-forming fiber-liquid separator wherein said fibers are formed into a fibrous mat; said emulsifier being a water soluble nonionic emulsifier which meets the standard provided by the test comprising the following steps: (1) preparing an initial admixture consisting essentially of water, waxed paper, and emulsifier, in which admixture waxed paper is present in an amount of 3.3% by weight based on the weight of the water, and in which the waxed paper has a wax content of 17% by weight, and wherein the emulsifier is present in said initial admixture in an amount of 0.333% by weight based on the weight of the water in the initial admixture; (2) heating the resulting admixture to a temperature in the range 175–180° F. and stirring the heated admixture for 15 minutes while in that temperature range; (3) adding ambient room temperature water to said admixture in an amount which is five times the volume of the admixture and admixing the added water therewith to provide a diluted admixture having an overall temperature which is below the melting point of the wax content thereof; (4) immediately filtering the resulting admixture through a 40 mesh screen to provide a diluted suspension and permitting the resulting diluted filtrate to stand for 24 hours at ambient room temperature, and observing the diluted filtrate suspension to determine whether said suspension is stable 24 hours after dilution; wherein the said emulsifier meets said standard if the diluted filtrate suspension of step (4) remains stable at ambient room temperature for 24 hours.

References Cited

UNITED STATES PATENTS

| | | | |
|---|---|---|---|
| 2,776,209 | 1/1957 | O'Flynn | 162—5 |
| 3,098,784 | 7/1963 | Gorman | 162—5 |
| 3,069,307 | 12/1962 | Boar et al. | 162—5 |
| 3,069,308 | 12/1962 | Lissant | 162—5 |

OTHER REFERENCES

Becher, Paul: *Emulsions: Theory and Technology*, New York, Reinhold Publishing Corp., 1957, p. 182.

Stephenson, J. Newell, ed. in chief: *Pulp and Paper Manufacturing*, vol. 3, New York, McGraw-Hill Book Co. Inc., 1953, pp. 2, 562–563.

ROBERT L. LINDSAY, JR., Primary Examiner

W. F. SMITH, Assistant Examiner

UNITED STATES PATENT OFFICE
CERTIFICATE OF CORRECTION

Patent No. 3,822,178          Dated July 2, 1974

Inventor(s) Andreas von Koeppen and Reinaldo T. Carrera

It is certified that error appears in the above-identified patent and that said Letters Patent are hereby corrected as shown below:

Column 1, line 35, "apper" should read --paper--
Column 1, line 49, "probelms" should read --problems--
Column 1, line 50, "realtively expansive" should read --relatively expensive--
Column 1, line 60, after "to", second occurrence, insert -- a --
Column 2, line 45, "polyethxyethanols" should read --polyethoxyethanols--
Column 8, line 60 "+ 25#/ton" should read --25#/ton--
Column 12, line 2, "above" should read --about--
Column 18, line 48, "charged" should read --charging--

Signed and sealed this 7th day of January 1975.

(SEAL)
Attest:

McCOY M. GIBSON JR.
Attesting Officer

C. MARSHALL DANN
Commissioner of Patents